US007747836B2

(12) United States Patent
Rajan et al.

(10) Patent No.: US 7,747,836 B2
(45) Date of Patent: Jun. 29, 2010

(54) INTEGRATED STORAGE VIRTUALIZATION AND SWITCH SYSTEM

(75) Inventors: Vijayan Rajan, Mountain View, CA (US); Brian Pawlowski, Palo Alto, CA (US); Jeffrey S. Kimmel, Chapel Hill, NC (US); Gary Ross, Pleasanton, CA (US)

(73) Assignee: NetApp, Inc., Sunnyvale, CA (US)

( * ) Notice: Subject to any disclaimer, the term of this patent is extended or adjusted under 35 U.S.C. 154(b) by 0 days.

(21) Appl. No.: 11/119,085

(22) Filed: Apr. 29, 2005

(65) Prior Publication Data

US 2006/0206603 A1 Sep. 14, 2006

Related U.S. Application Data

(60) Provisional application No. 60/659,985, filed on Mar. 8, 2005.

(51) Int. Cl.
*G06F 13/14* (2006.01)
(52) U.S. Cl. ................. 711/203; 711/206; 711/E12.059
(58) Field of Classification Search ................. 711/203, 711/206
See application file for complete search history.

(56) References Cited

U.S. PATENT DOCUMENTS

| 5,819,292 | A | 10/1998 | Hitz et al. |
| 6,289,356 | B1 | 9/2001 | Hitz et al. |
| 6,981,094 | B2* | 12/2005 | Nonaka et al. ............... 711/114 |
| 7,107,385 | B2 | 9/2006 | Rajan et al. |
| 7,111,147 | B1 | 9/2006 | Strange |
| 7,502,375 | B2* | 3/2009 | Hahn et al. .................. 370/401 |
| 2004/0028063 | A1 | 2/2004 | Roy et al. |
| 2004/0030668 | A1* | 2/2004 | Pawlowski et al. .............. 707/1 |
| 2004/0068561 | A1 | 4/2004 | Yamamoto et al. |
| 2005/0015460 | A1 | 1/2005 | Gole et al. |

FOREIGN PATENT DOCUMENTS

EP 05 851 936.4 8/2009

OTHER PUBLICATIONS

Daniel, Stephen. "Converging SAN and NAS Storage: A Comparasion of Unified and Gateway Solutions" Network Appliance White Paper. Oct. 2002 pp. 1-10.*
Ainhoa Barrio Baranano, International Search Report for PCT/US2005/042172, Apr. 11, 2006.
U.S. Appl. No. 60/659,985, filed Mar. 8, 2005, Rajan et al.

* cited by examiner

*Primary Examiner*—Reginald G Bragdon
*Assistant Examiner*—Kenneth M Lo
(74) *Attorney, Agent, or Firm*—Cesari and McKenna, LLP

(57) ABSTRACT

A system integrates an intelligent storage switch with a flexible virtualization system to enable efficient service of file and block protocol data access requests for information stored on the system. A storage operating system executing on a storage system coupled to the switch implements the virtualization system to provide a unified view of storage to clients by logically organizing the information as named files, directories and logical unit numbers. The virtualization system is illustratively embodied as a file system having a write allocator configured to provide a flexible block numbering policy that addresses volume management capabilities, such as storage virtualization, at a finer granularity (e.g., a single block) than that of previous non-flexible storage virtualization schemes. The flexible block numbering policy also yields substantial benefits in terms of increased write efficiency and elimination of storage "hot spots", as well as a compelling point-in-time read-only data image (snapshot) mechanism.

34 Claims, 9 Drawing Sheets

INTEGRATED STORAGE VIRTUALIZATION AND SWITCH SYSTEM

CROSS-REFERENCE TO RELATED APPLICATIONS

The present application claims the benefit of U.S. Provisional Patent Application Ser. No. 60/659,985, which was filed on Mar. 8, 2005, by Vijayan Rajan for an INTEGRATED STORAGE VIRTUALIZATION AND SWITCH SYSTEM and is hereby incorporated by reference.

The present invention is related to the following co-pending U.S. Patent Application Publication Nos. 2004-0030668-A1, titled MULTI-PROTOCOL STORAGE APPLIANCE THAT PROVIDES INTEGRATED SUPPORT FOR FILE AND BLOCK ACCESS PROTOCOLS, published on Feb. 12, 2004, and 2004-0030822-A1, titled STORAGE VIRTUALIZATION BY LAYERING VIRTUAL DISK OBJECTS ON A FILE SYSTEM, now issued as U.S. Pat. No. 7,107,385 on Sep. 12, 2006, each of which is hereby incorporated by reference as though fully set forth herein.

FIELD OF THE INVENTION

The present invention relates to storage systems and, in particular, to system that integrates an intelligent storage switch with a flexible virtualization system of a storage system.

BACKGROUND OF THE INVENTION

A storage system is a computer that provides storage service relating to the organization of information on writable persistent storage devices, such as memories, tapes or disks. The storage system may be deployed within a storage area network (SAN) or a network attached storage (NAS) environment. When used within a NAS environment, the storage system may be embodied as a file server including an operating system that implements a file system to logically organize the information as a hierarchical structure of directories and files on, e.g., the disks. Each "on-disk" file may be implemented as a set of data structures, e.g., disk blocks, configured to store information, such as the actual data for the file. A directory, on the other hand, may be implemented as a specially formatted file in which information about other files and directories are stored.

The file server, or filer, may be further configured to operate according to a client/server model of information delivery to thereby allow many client systems (clients) to access shared resources, such as files, stored on the filer. Sharing of files is a hallmark of a NAS system, which is enabled because of semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the filer by exchanging discrete frames or packets of data according to pre-defined protocols, such as the Transmission Control Protocol/Internet Protocol (TCP/IP).

In the client/server model, the client may comprise an application executing on a computer that "connects" to the filer over a computer network, such as a point-to-point link, shared local area network, wide area network or virtual private network implemented over a public network, such as the Internet. NAS systems generally utilize file-based access protocols; therefore, each client may request the services of the filer by issuing file system protocol messages (in the form of packets) to the file system over the network. By supporting a plurality of file system protocols, such as the conventional Common Internet File System (CIFS), the Network File System (NFS) and the Direct Access File System (DAFS) protocols, the utility of the filer may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media (i.e., network) adapted to operate with block access protocols, such as Small Computer Systems Interface (SCSI) protocol encapsulation over FC or TCP/IP/Ethernet. A SAN arrangement or deployment further allows decoupling of storage from the storage system, such as an application server, and placing of that storage on a network. However, the SAN storage system typically manages storage resources pre-assigned by a user, e.g., a system administrator. A client accesses the information stored on these storage resources in terms of block addressing using, e.g., a logical unit number (lun).

Storage virtualization generally involves the pooling of storage resources from multiple storage devices, such as physical disks, typically across a network by one or more storage systems to create a "logical unit". The term "logical unit" as conventionally used in a SAN environment implies a storage entity that is constructed (by a system administrator) by specifying physical disks and extents within those disks via "carving" operations (such as slicing and/or partitioning) that combine those extents/disks into a user-defined volume storage entity. An extent is a set of contiguously addressed blocks (or "slices") of storage within the specified physical disks. Such construction can occur on either the storage device or application server. As used in this context, the term lun refers to an addressable storage entity backed by data containers such as logical units.

As used in the SAN industry, a storage virtualization scheme is a way of mapping ranges of block numbers for a lun (from the client's view) onto sets of ranges of block numbers on "backend" storage devices. A conventional SAN system may implement a simplified notion of storage virtualization that presents a view of storage (i.e., a user-defined volume) to a client, wherein the logical unit is formed from extents of various disks accessible to the client that are selected by a user or system administrator. This simplified virtualization scheme involves the layering of luns over the user-defined logical unit. The SAN system may further implement a static block numbering policy (such as, e.g., a write in-place storage system) wherein the locations of lun data structures, such as data blocks, on disk are fixed. Changes to the data blocks are made "in place" in accordance with the write in-place storage system. Accordingly, the SAN system provides logical unit management capabilities, but in a fixed and non-flexible manner with respect to the block numbering policy of the simplified storage virtualization scheme.

There are a number of additional shortcomings associated with the conventional SAN storage system, including the inability to efficiently scale the system architecture. In this context, scalability involves connectivity with respect to clients of the storage system, as well as sizing and performance of backend storage coupled to the system. In particular, there is a limit to the number of clients that can connect to the storage system because of a constraint on the number of network adapters that can be accommodated by the system platform. In addition, there is a limit to the number of storage adapters that the storage system can accommodate, thus restricting sizing/scalability of storage coupled to the system. Moreover, the SAN system typically stores incoming data access requests while rendering decisions as to the locations of data targeted by the incoming requests. Such "store and forward" operations are bounded by various architectural limitations, such as buffer memory bandwidth, that affect the performance of the storage system.

SUMMARY OF THE INVENTION

The present invention overcomes the disadvantages of the prior art by providing a system that integrates an intelligent storage switch with a flexible virtualization system to enable efficient service of file and block protocol data access requests for information stored on the system. A storage operating system executing on a storage system coupled to the switch implements the virtualization system to provide a unified view of storage to clients by logically organizing the information as named files, directories and logical unit numbers (luns). The virtualization system is illustratively embodied as a file system having a write allocator configured to provide a flexible block numbering policy that addresses volume management capabilities, such as storage virtualization, at a finer granularity (e.g., a single block) than that of previous non-flexible storage virtualization schemes. The flexible block numbering policy also yields substantial benefits in terms of increased write efficiency and elimination of storage "hot spots", as well as a compelling point-in-time read-only data image (snapshot) mechanism.

In one embodiment of the invention, the virtualization system configures the storage switch with virtualization mapping metadata (virtualization mappings) that translate the data access requests to locations of the information served by storage units connected to the switch. The virtualization mappings are illustratively logical to physical block numbers, and are initially loaded into a data structure (such as a mapping table) of switch ports in the intelligent storage switch by the write allocator executing in the storage system. Notably, the write allocator generates those mappings in accordance with the flexible block numbering policy (e.g., a write-anywhere file system layout policy).

In another embodiment of the invention, write allocation is performed by and, thus storage virtualization is delegated to, the switch ports of the intelligent storage switch. Here, the write allocator is located in one or more of the switch ports, which illustratively include "ingress" data ports coupled to the network and "egress" storage ports connected to the storage units. The write allocator is preferably located in the storage ports when a lun is known to exist on storage devices serviced by a single storage unit, but is otherwise located in the data ports when the lun is distributed across multiple storage units. In either case, the write allocator generates the appropriate virtualization mappings and loads them into the mapping table.

Once the write allocator provides the switch ports with the virtualization mappings of storage locations specified by a client block-based data access request, the storage appliance "steps aside" as a high-speed connection is created through the switch between a data port and a storage port coupled to a storage unit. Notably, the storage appliance does not buffer (temporarily store) the request, including any data, associated with a lun served by the storage unit. Rather the request and data are buffered at the data port of the switch until transferred to the storage unit, which then accesses one or more locations of the storage devices as determined by the virtualization mappings.

The integrated storage virtualization and switch system facilitates scaling of the storage system by increasing the connectivity between clients and the storage system through the use of additional data ports provided by the storage switch. The size and performance of storage devices served by the storage system can also be scaled by increasing the number of connections to the storage units through the use of additional storage ports provided by the switch. Moreover, storage performance of the system is enhanced by obviating the use of "store and forward" operations within the storage system for block-based protocol traffic. Instead, such traffic is transferred directly between the clients and the storage units through the switch.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

Figure 1:
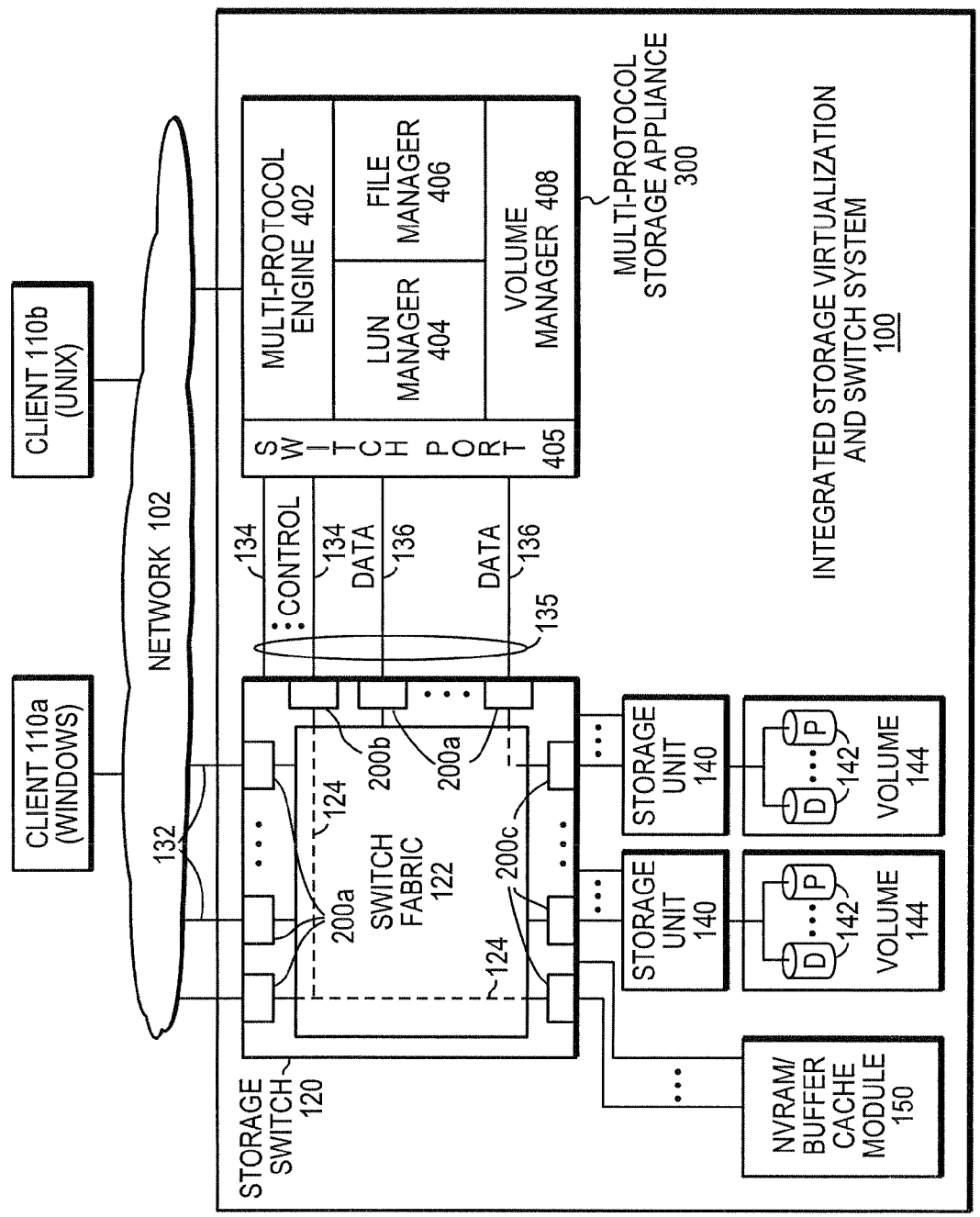
FIG. 1 is a schematic block diagram of a system having a multi-protocol storage appliance coupled to a storage switch in an integrated manner.

FIG. 1 is a schematic block diagram of a system having a storage system coupled to a storage switch in an integrated manner. The integrated system 100 serves both file and block protocol access to information stored on storage devices. The storage system is illustratively a multi-protocol storage appliance 300 having features such as simplicity of storage service management and ease of storage reconfiguration, including reusable storage space, for users (system administrators) and clients 110 of network attached storage (NAS) and storage area network (SAN) deployments. The storage switch 120 is an intelligent, high-performance intermediate network device having a plurality of ports 200 interconnected by a switch fabric 122 that provides a switching function to transfer information among the ports.

A storage operating system (FIG. 4) executing on the appliance 300 implements a flexible virtualization system (and, in particular, a file system) that provides a unified view of storage served by storage units 140 of the system 100. To that end, the storage operating system is organized as a network protocol stack or, more generally, a multi-protocol engine 402 that provides data paths for clients 110 to access information stored on the system 100. A logical unit number (lun) manager 404 cooperates with a file manager 406 to logically organize the stored information as named files, directories and luns. In addition, a volume manager 408 provides virtualization mapping metadata (virtualization mappings) to the storage switch 120 over a switch port 405; as described further herein, the virtualization mappings may correlate (map) a logical view of the information requested by a client to an intermediate "physical" view of that information exported by the storage units 140. In sum, the storage appliance 300 may provide NAS services through the file manager 406, while also providing SAN services, including lun emulation, through the lun manager 404.

The clients 110 may be general-purpose computers configured to execute applications over a variety of operating systems, including the UNIX® and Microsoft® Windows™ operating systems. Client systems generally utilize file-based access protocols when accessing information (in the form of files and directories) over a computer network 102 comprising point-to-point links, wide area networks, virtual private networks implemented over a public network (Internet) or shared local area networks. The clients 110 communicate with the storage appliance 300 of the integrated system 100 over network 102 by exchanging discrete frames or packets of data according to predefined protocols, such as the Transmission Control Protocol/Internet Protocol (TCP/IP). Therefore, each client may request the services of the integrated system by issuing file access protocol messages (in the form of packets) to the system over the network 102.

For example, a client 110a running the Windows operating system may communicate with the storage appliance 300 using the Common Internet File System (CIFS) protocol over TCP/IP. On the other hand, a client 110b running the UNIX operating system may communicate with the appliance using either the Network File System (NFS) protocol over TCP/IP or the Direct Access File System (DAFS) protocol over a virtual interface (VI) transport in accordance with a remote DMA (RDMA) protocol over TCP/IP. It will be apparent to those skilled in the art that other clients running other types of operating systems may also communicate with the integrated multi-protocol storage appliance using other file access protocols.

Whereas clients of a NAS-based network environment have a storage viewpoint of files, the clients of a SAN-based network environment have a storage viewpoint of blocks or luns. To that end, the integrated storage and switch system 100 presents (exports) luns to SAN clients through the creation of virtual disk (vdisk) objects. A vdisk object is a special file type that is implemented by the virtualization system of the storage appliance 300 and translated into an emulated lun as viewed by the SAN clients. The integrated system 100 thereafter makes these emulated luns accessible to the SAN clients through controlled exports.

The clients 110 generally utilize block-based access protocols, such as the Small Computer Systems Interface (SCSI) protocol, when accessing information (in the form of blocks, disks or luns) over network 102. For this SAN-based network environment, the storage switch 120 may be coupled to an illustrative Fibre Channel (FC) network. FC is a networking standard describing a suite of protocols and media that is primarily found in SAN deployments. SCSI is a peripheral input/output (I/O) interface with a standard, device independent protocol that allows different peripheral storage devices, such as disks 142, to attach to the integrated system 100. In SCSI terminology, clients 110 operating in a SAN environment are initiators that initiate requests and commands for data. The integrated multi-protocol storage appliance and switch system 100 is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The integrated system 100 supports various SCSI-based protocols used in SAN deployments, including SCSI encapsulated over TCP (iSCSI) and SCSI encapsulated over FC (FCP). The initiators (hereinafter clients 110) may thus request the services of the target (hereinafter integrated system 100) by issuing iSCSI and FCP messages over the network 102 to access information stored on the disks. It will be apparent to those skilled in the art that the clients may also request the services of the integrated storage virtualization and switch system using other block access protocols. By supporting a plurality of block access protocols, the integrated system 100 provides a unified and coherent access solution to luns in a heterogeneous SAN environment.

The switch fabric 122 of the storage switch 120 is illustratively organized as a conventional crossbar having point-to-point connections 124 between all ports 200 on the switch. The point-to-point connections 124 facilitate transfer of information traffic between two ports independent of the transfer of such traffic among other ports of the switch. The ports of the storage switch include "ingress" data ports 200a coupled to the network 102 and storage appliance 300, one or more control ports 200b coupled to the storage appliance 300, and "egress" storage ports 200c coupled to "backend" storage units 140 and other external storage modules. Each backend storage unit 140 may comprise an intelligent device, such as a filer/storage appliance. However, an illustrative embodiment of the storage unit 140 comprises a disk controller coupled to one or more shelves of disks 142. For that embodiment, storage unit 140 includes a storage adapter having input/output (I/O) interface circuitry that couples to the disks 142 over an I/O interconnect arrangement, such as a conventional high-performance, FC serial link topology.

Storage of information on the storage unit 140 is preferably implemented as one or more storage volumes 144 that comprise a cluster of physical storage disks 142, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may used in accordance with the present invention.

Specifically, each volume 144 is constructed from an array of physical disks 142 that are organized as RAID groups. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed. However, a typical implementation may include three data and one parity disk per RAID group and at least one RAID group per volume.

The integrated storage virtualization and switch system 100 includes non-volatile random access memory (NVRAM) that may be located in either the storage appliance 300 or on the storage units 140. However, in the illustrative embodiment of the invention, the NVRAM is preferably located external to the switch; that is, the NVRAM is embodied on a storage module 150 that is externally coupled to the storage switch 120. The NVRAM is illustratively a solid-state memory array having either back-up battery or other built-in last-state-retention capabilities that holds the last state of the memory in the event of any power loss to the array. The external storage module 150 may further include a buffer cache that, as a separate entity, allows efficient access by the storage appliance and the storage units. In this embodiment, the NVRAM/buffer cache module 150 is coupled to the switch 120 via a dedicated storage port 200c.

The control ports 200b of the storage switch 120 are coupled to the storage appliance 300 via "side band" control links 134, while the data ports 200a are coupled to the network 102 and storage appliance 300 via "in-band" data links 132, 136. The data links 132 enable connections from the clients 110 to the storage switch 120 over the network 102, whereas the data links 136 enable connections from the storage appliance 300 to the switch 120; in both cases, the links 132, 136 carry data traffic to and from the storage units 140. The control links 134 carry control traffic that flows between the storage switch 120 and storage appliance 300 to instruct the data ports 200a as to the virtualization needed for particular data traffic flowing over the data links 136 through the storage switch. The control and data links 134, 136 coupling the ports 200a,b to the storage appliance 300 are preferably configured as cluster interconnect media 135 that is illustratively embodied as one or more Fibre Channel (FC) links. That is, the links 134, 136 are logically independent links that, depending upon the application, may be physically separate links or a single shared link.

Figure 2:
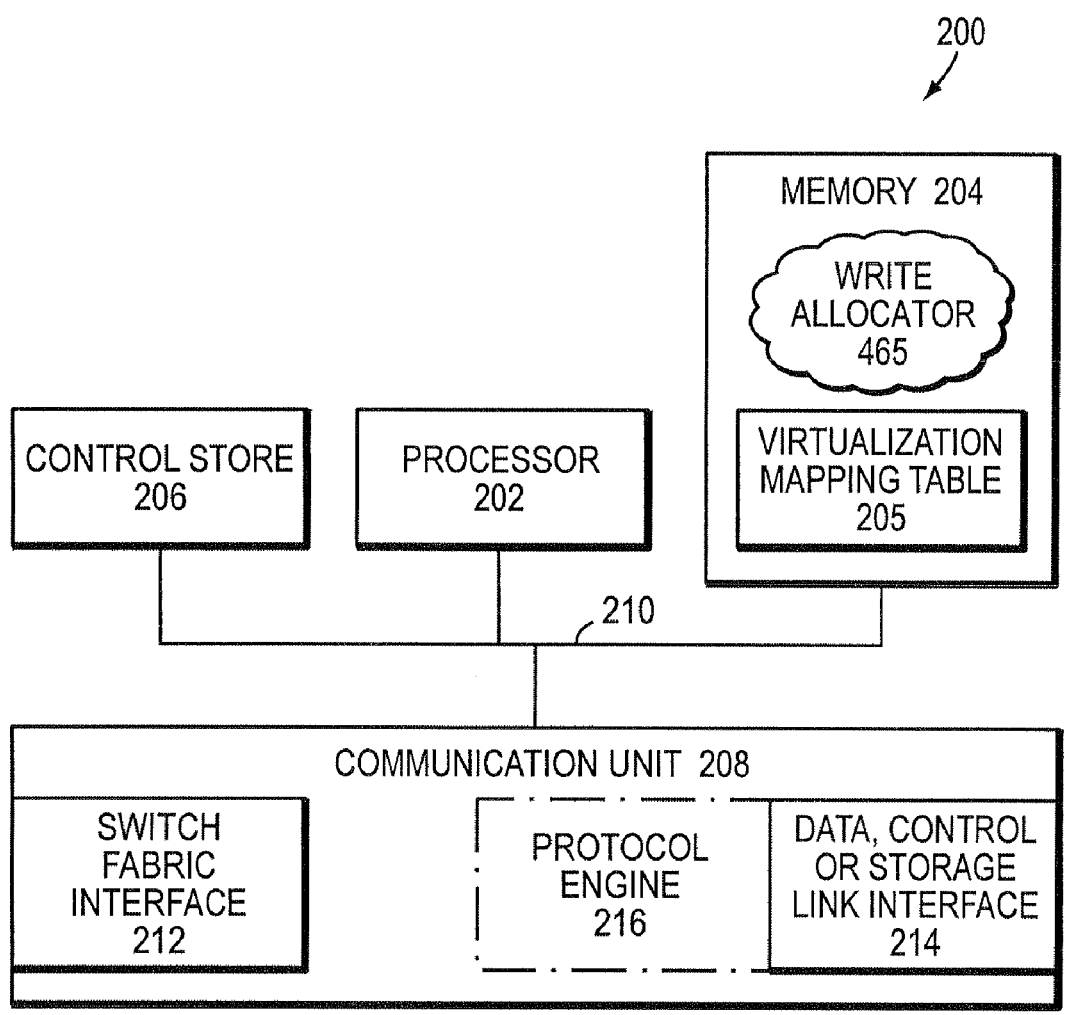
FIG. 2 is a schematic block diagram of a port on the storage switch.

FIG. 2 is a schematic block diagram of a port 200 on the storage switch 120. Each port 200 has "intelligence" in the form of port circuitry comprising one or more processing elements, e.g., processor 202, a memory 204, a control store 206 and a communication unit 208 interconnected by a bus 210. The control store 206 contains program instructions executed by the processor, whereas the memory 204 comprises memory locations that are addressable by the processor for storing one or more data structures, such as virtualization mapping table 205 configured to hold virtualization mappings provided by the storage appliance 300. In accordance with the storage virtualization technique of the integrated system 100, the processor 202 utilizes the contents of the virtualization mapping table 205 to transfer a data access request packet over a point-to-point connection 124 (data path) of the switch fabric 122 at line speed.

The communication unit 208 includes an interface 212 that connects the port circuitry to the crossbar switch fabric 122 (e.g., a SPI-4 interface) as well as an interface 214 that connects the port to various links, depending upon the type of port 200. For example when functioning as an ingress data port 200a to the network 102, the interface 214 embodies a block-based, network "target" adapter (FCP, iSCSI) that connects to a data link (e.g., a gigabit Ethernet link or FC link) to enable client access to the information stored as luns or blocks on the disks 142. Each client may have access to multiple data ports 200a of the storage switch, wherein each data port may be associated with a network address, such as an IP address. For this type of data port, the interface 214 is configured with a protocol engine 216 that provides data paths for clients 110 to access information stored on the system 100. The protocol engine is also capable of terminating a connection between a client and the storage switch 120 and, thus, functions as a termination end point of the connection. Each data port 200a is preferably configured with only one type of protocol engine, e.g., FCP or iSCSI. When functioning as a control port 200b or a storage port 200c, the interface 214 connects to a control or storage link, e.g., a FC link.

At any point in time, there may be two ports 200 communicating within the storage switch 120. For example, in response to reception of a block-based data access request from a client 110, a data port 200a may send a request for a virtualization mapping over a point-to-point, SPI-4 link connection 124 to a control port 200b, which then communicates over a FC control link 134 with the storage appliance 300. The storage appliance returns the virtualization mapping over control link 134, through control port 200b and over the SPI-4 link 124 to the data port 200a. The protocol executed over the FC control link 134 is illustratively a conventional FC virtual interface (FCVI) protocol; accordingly, communication between the data port 220a and control port 200b also utilizes the FCVI protocol. The data port 200a then utilizes the virtualization mapping to communicate with a storage port 200c over another SPI-4 link connection 124 to transfer the data access request to a storage unit 140. Communication between the data port 200a and storage port 200c is illustratively effected in accordance with a block-based access protocol, such as the SCSI protocol.

Figure 3:
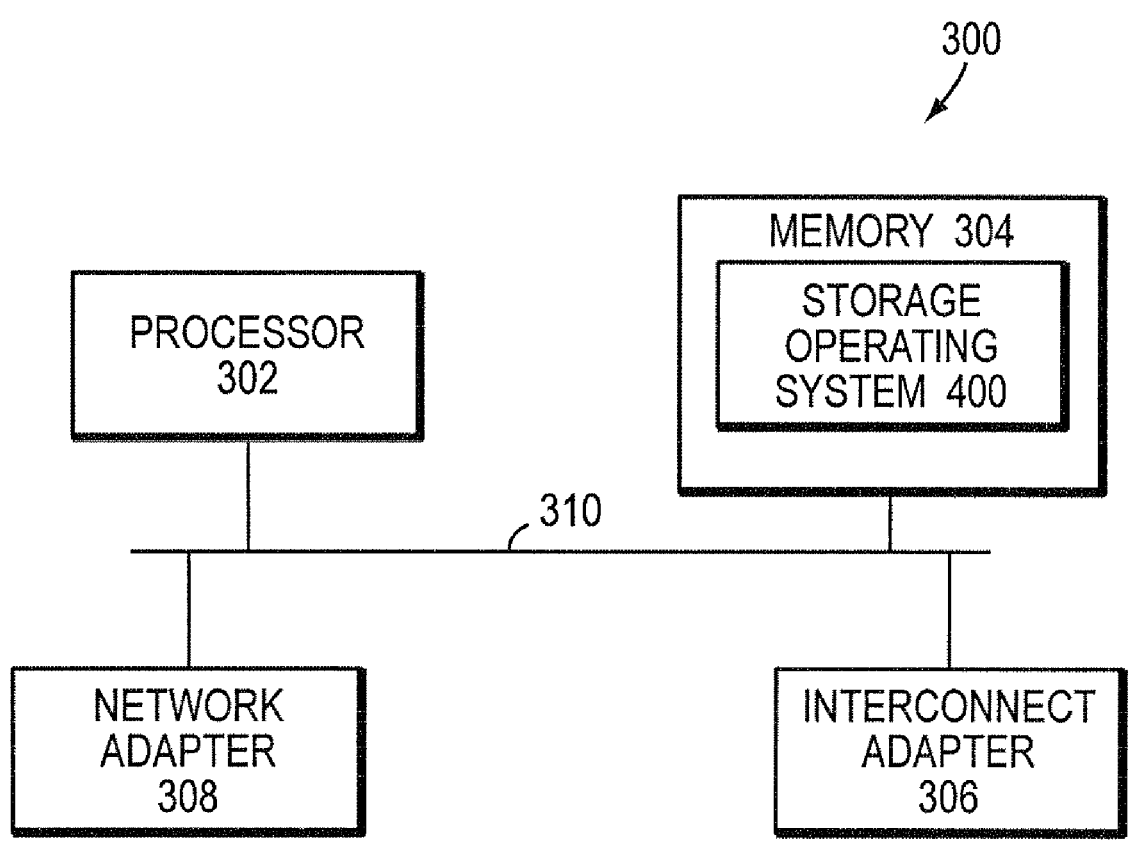
FIG. 3 is a schematic block diagram of the multi-protocol storage appliance of the integrated system.

FIG. 3 is a schematic block diagram of the multi-protocol storage appliance 300 illustratively embodied as a storage system comprising a processor 302, a memory 304, an interconnect adapter 306 and one or more network adapters 308 interconnected by a system bus 310. The memory 304 comprises locations that are addressable by the processor and adapters for storing software program code and data structures. The processor and adapters may, in turn, comprise processing elements and/or logic circuitry configured to execute the software code and manipulate the data structures. The storage operating system 400, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 308 couples the storage appliance to a plurality of clients 110a,b over network 102 and, to that end, may comprise a network interface card (NIC) having the mechanical, electrical and signaling circuitry needed to connect the appliance to the network. Likewise, the interconnect adapter 306 comprises the mechanical, electrical and signaling circuitry needed to connect the storage appliance to the storage switch 120 over, e.g., the cluster interconnect media 135 embodied as FC links 134, 136. As a result, the interconnect adapter 306 illustratively embodies switch port 405 (FIG. 1) configured to communicate with the switch according to a predefined protocol such as, e.g., the FCVI protocol.

The storage operating system 400 implements a write-anywhere file system of a virtualization system that "virtualizes" the storage space provided by disks 142. In one aspect, the file system embodies file manager 406 to logically organize the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. In another aspect, the virtualization system embodies lun manager 404 to further logically organize information as a hierarchical structure of named vdisks on the disks. These aspects of the storage operating system 400 provide an integrated NAS and SAN appliance approach to storage by enabling file-based (NAS) access to the named files and directories, while further enabling block-based (SAN) access to the named vdisks on a file-based storage platform.

In the illustrative embodiment, the storage operating system is preferably the NetApp® Data ONTAP™ operating system available from Network Appliance, Inc., Sunnyvale, Calif. that implements a Write Anywhere File Layout (WAFL®) file system. However, it is expressly contemplated that any appropriate storage operating system, including a write in-place file system, may be enhanced for use in accordance with the inventive principles described herein. As such, where the term "WAFL" is employed, it should be taken broadly to refer to any storage operating system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 4:
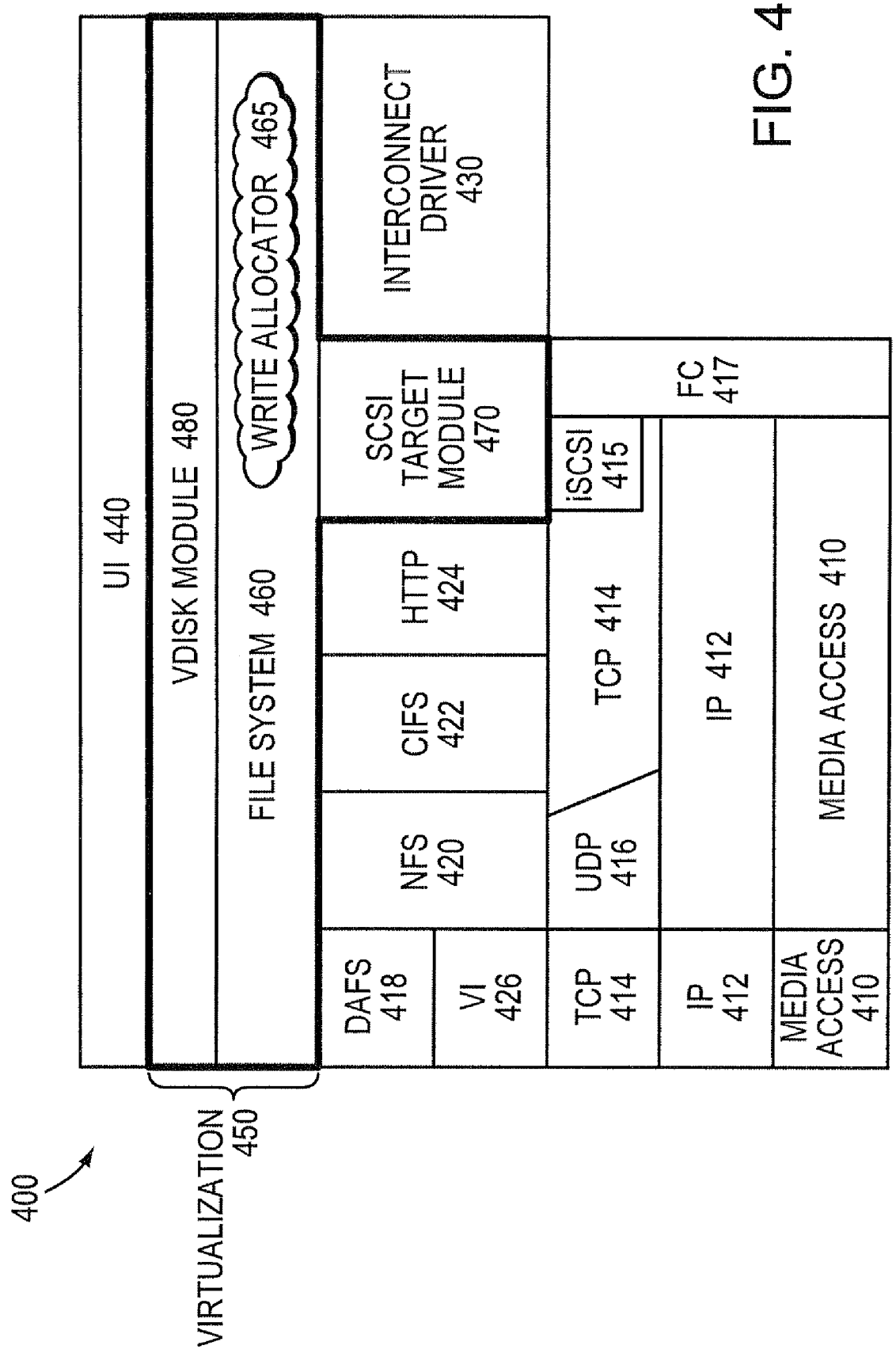
FIG. 4 is a schematic block diagram of a storage operating system of the multiprotocol storage appliance that may be advantageously used with the present invention.

FIG. 4 is a schematic block diagram of the storage operating system 400 that may be advantageously used with the present invention. The storage operating system comprises a series of software layers organized to form an integrated network protocol stack or, more generally, multi-protocol engine 402 (FIG. 1) that provides data paths for clients to access information stored on the multi-protocol storage appliance using, e.g., file access protocols. The protocol stack includes a media access layer 410 of network drivers (e.g., gigabit Ethernet drivers) that interfaces to network protocol layers, such as the IP layer 412 and its supporting transport mechanisms, the TCP layer 414 and the User Datagram Protocol (UDP) layer 416. A file system protocol layer provides multi-protocol file access and, to that end, includes support for the DAFS protocol 418, the NFS protocol 420, the CIFS protocol 422 and the Hypertext Transfer Protocol (HTTP) protocol 424. A VI layer 426 implements the VI architecture to provide direct access transport (DAT) capabilities, such as RDMA, as required by the DAFS protocol 418. Also included in storage operating system 400 is an iSCSI module 415 that implements SCSI over TCP/IP and a FC (fibre channel) driver 417 that processes FC operations.

A virtualization system 450 is implemented by file system 460 interacting with virtualization modules illustratively embodied as, e.g., vdisk module 480 and SCSI target module 470. The vdisk module 480 is layered on the file system 460 to enable access by administrative interfaces, such as UI 440, in response to a user (system administrator) issuing commands to the storage system. The SCSI target module 470 provides a translation layer of the virtualization system between the block (lun) space and the file system space, where luns are represented as blocks. The UI 440 is disposed over the storage operating system in a manner that enables administrative or user access to various layers and subsystems of the system 400. An interconnect driver 430 controls operation of the interconnect media 135 coupling the appliance 300 to the storage switch 120.

In the illustrative embodiment, the file system logically organizes information stored on the disks as a hierarchical structure of directories, files and blocks. For example, each "on-disk" file may be implemented as set of data structures, i.e., disk blocks, configured to store information, such as the actual data for the file. These data blocks are organized within a volume block number (vbn) space that is maintained by the file system. The file system organizes the data blocks within the vbn space as a "logical volume"; each logical volume may be, although is not necessarily, associated with its own file system. The file system typically consists of a contiguous range of vbns from zero to n, for a file system of size n−1 blocks.

The file system 460 is illustratively a message-based system that provides volume management capabilities for use in access to the information stored on the storage devices, such as disks. That is, in addition to providing file system semantics, the file system 460 provides functions normally associated with volume management. These functions include (i) aggregation of the disks, (ii) aggregation of storage bandwidth of the disks, and (iii) reliability guarantees, such as mirroring and/or parity (RAID). The virtualization modules illustratively cooperate with the file system 460 to embody volume manager 408 (FIG. 1) and thereby provide storage virtualization mappings when responding to requests to access the information stored on storage devices coupled to the storage units. The virtualization mappings map the logical view of the information requested by a client to a physical view of that information exported by the storage unit 140.

Figure 5:
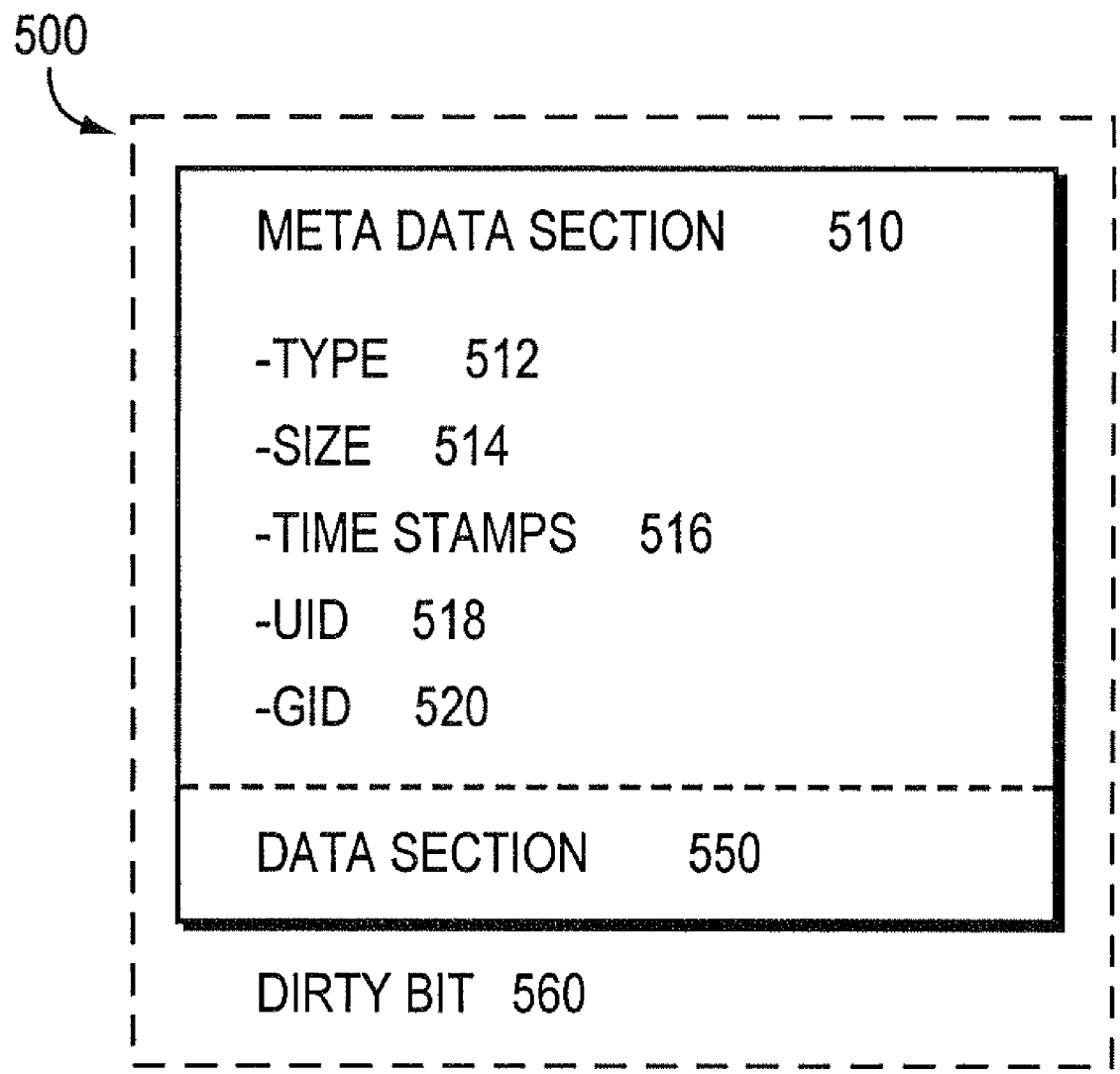
FIG. 5 is a schematic block diagram of an inode that may be advantageously used with the present invention.

Moreover, the file system 460 illustratively implements the WAFL file system having an on-disk format representation that is block-based using, e.g., 4 kilobyte (kB) blocks and using index nodes (inodes) to describe the files. In the illustrative embodiment, a file is represented in the write-anywhere file system as an inode data structure adapted for storage on the disks 142. FIG. 5 is a schematic block diagram of an inode 500, which preferably includes a metadata section 510 and a data section 550. The information stored in the metadata section 510 of each inode 500 describes the file and, as such, includes the type (e.g., regular, directory, vdisk) 512 of file, the size 514 of the file, time stamps (e.g., access and/or modification) 516 for the file and ownership, i.e., user identifier (UID 518) and group ID (GID 520), of the file. The contents of the data section 550 of each inode, however, may be interpreted differently depending upon the type of file (inode) defined within the type field 512. For example, the data section 550 of a directory inode contains metadata controlled by the file system, whereas the data section of a regular inode contains file system data. In this latter case, the data section 550 includes a representation of the data associated with the file.

When an on-disk inode (or block) is loaded from disk 142 into memory 304 (e.g., buffer cache), its corresponding in core structure embeds the on-disk structure. For example, the dotted line surrounding the inode 500 indicates the in core representation of the on-disk inode structure. The in core structure is a block of memory that stores the on-disk structure plus additional information needed to manage data in the memory (but not on disk). The additional information may include, e.g., a "dirty" bit 560. After data in the inode (or block) is updated/modified as instructed by, e.g., a write operation, the modified data is marked "dirty" using the dirty bit 560 so that the inode (block) can be subsequently "flushed" (stored) to disk. The in core and on-disk format structures of the WAFL file system, including the inodes and inode file, are disclosed and described in the previously incorporated U.S. Pat. No. 5,819,292 titled Method for Maintaining Consistent States of a File System and for Creating User-Accessible Read-Only Copies of a File System by David Hitz et al., issued on Oct. 6, 1998.

Figure 6:
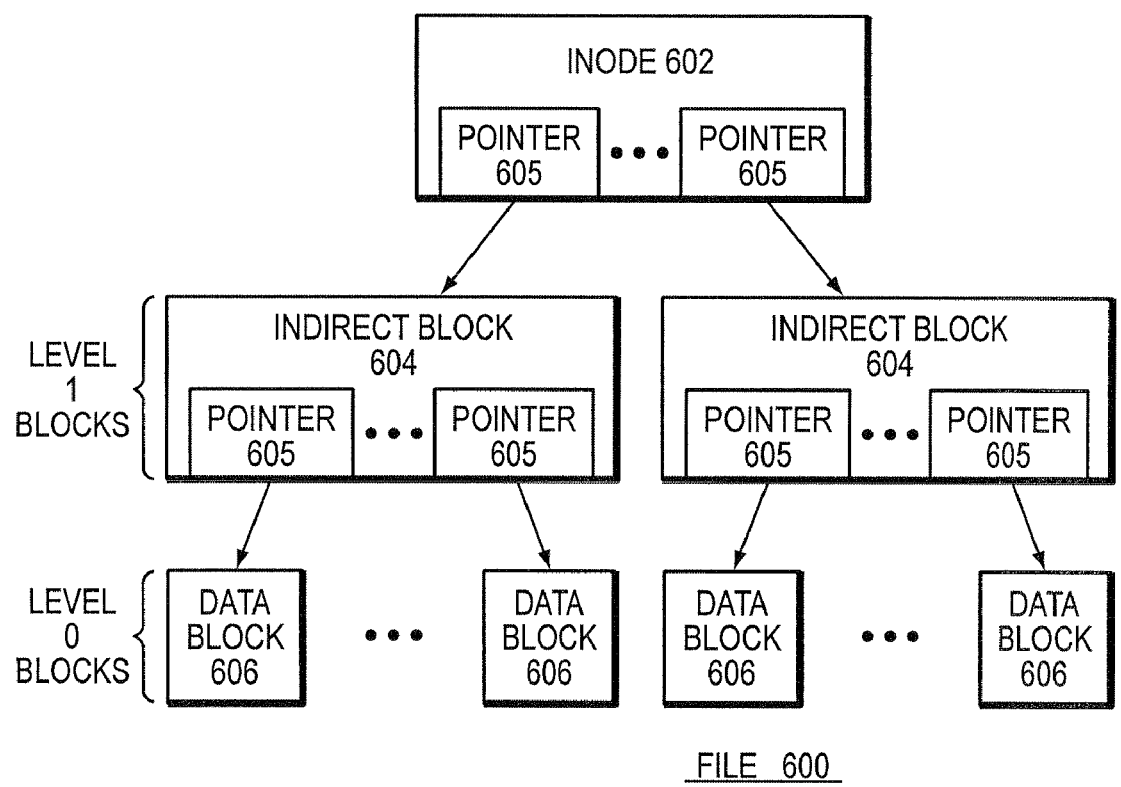
FIG. 6 is a schematic block diagram of a buffer tree of a file that may be advantageously used with the present invention.

FIG. 6 is a schematic block diagram of a buffer tree of a file that may be advantageously used with the present invention. The buffer tree is an internal representation of blocks for a file (e.g., file A 600) loaded into memory 304 (e.g., buffer cache) and maintained by the write-anywhere file system 460. A root (top-level) inode 602 references indirect (e.g., level 1) blocks 604. The indirect blocks (and inode) contain pointers 605 that ultimately reference data blocks 606 used to store the actual data of file A. That is, the data of file A 600 are contained in data blocks and the locations of these blocks are stored in the indirect blocks of the file. Each level 1 indirect block 604 may contain pointers to as many as 1024 data blocks. According to the "write anywhere" nature of the file system, these blocks may be located anywhere on the disks 142.

In accordance with the present invention, the integrated storage virtualization and switch system 100 provides a flexible virtualization system 450 that enables efficient service of file and block protocol data access requests for information stored on the system. The flexible virtualization system is illustratively embodied as a write allocator 465 (of file system 460) configured to provide a flexible block numbering policy that addresses volume management capabilities, such as storage virtualization, at a finer granularity (e.g., a single block) than that of previous non-flexible storage virtualization schemes. The flexible block numbering policy also yields substantial benefits in terms of increased write efficiency and elimination of storage "hot spots", as well as a compelling point-in-time read-only data image (snapshot) mechanism.

In one embodiment of the invention, the virtualization system 450 configures the storage switch 120 with virtualization mapping metadata (virtualization mappings) that translate the data access requests to locations of the information served by the storage units 140. The virtualization mappings are illustratively logical to physical block numbers, and are initially loaded into a data structure (such as virtualization mapping table 205) of the switch ports 200 by the write allocator 465 executing in the storage appliance 300. Notably, the write allocator generates those mappings in accordance with the flexible block numbering policy, e.g., a write-anywhere file system layout policy that is illustratively implemented by the WAFL file system. The WAFL file system and an exemplary write anywhere file system layout are described in U.S. Pat. No. 6,289,356, titled Write Anywhere File System Layout, by David Hitz et al., issued Sep. 11, 2001, which patent is hereby incorporated by reference.

Briefly, the write allocator implements the flexible block numbering policy by performing write allocation of blocks in a logical volume in response to an event in the file system (e.g., dirtying of a block in a file). As noted, the data blocks are organized within a volume block number (vbn) space that is maintained by the file system 460. According to the write allocation policy, the write allocator chooses a "logical" vbn for a selected block from among free blocks within its vbn space to which to write the dirty block. The write allocator then places the chosen vbn into an indirect block or inode file "parent" of the allocated block. Thereafter, the file system "frees" the dirty block, effectively returning that block to the vbn space.

The write allocator 465 also generates a virtualization mapping for the chosen vbn that essentially translates the logical vbn to a "physical" disk block number (dbn) location on a particular disk (disk, dbn) within a RAID group of the volume. Illustratively, each block in the vbn space and in the dbn space is fixed, e.g., 4 k bytes (kB), in size; accordingly, there is typically a one-to-one mapping between the information stored on the disks in the dbn space and the information organized by the file system in the vbn space. The (disk, dbn) location is illustratively exported by the storage unit 140 to the file system (write allocator 465). A disk driver of the storage unit 140 may further translate the (disk, dbn) location into one or more sectors on the specified disk.

In response to a write data access request to a lun issued by a client 110 over computer network 102, the write allocator 465 generates new logical to physical block number mappings for portions of the lun that are overwritten with new data and allocates new blocks for those overwritten portions of the lun. The newly generated mappings are stored ("cached") in the mapping table 205 of the switch port 200. Thereafter, the new data and mappings are simultaneously written (via one or more write operations) to storage devices 142. As an optimization, the new data may be first written to NVRAM of module 150 to thereby facilitate rapid client response without having to wait for completion of the write operations.

In another embodiment of the invention, write allocation is performed by and, thus storage virtualization is delegated to, the switch ports 200 of the intelligent storage switch 120. Here, the write allocator 465 is located in one or more of the switch ports, which illustratively include "ingress" data ports 200a coupled to the network 102 and "egress" storage ports 200c connected to the storage units 140. The write allocator 465 is preferably located in the storage ports 200c when a lun is known to exist on storage devices 142 serviced by a single storage unit 140, but is otherwise located in the data ports 200a when the lun is distributed across multiple storage units. In either case, the write allocator generates the appropriate virtualization mappings and loads them into the mapping table 205.

When located in the storage ports 200c, the write allocator 465 maintains a pool of free blocks that is tied to the single storage unit. That is, in situations where the physical locations of information on the storage devices 142 are "static" and reflect the placement policy of each storage unit 140, the storage port 200c caches a free block list provided by its connected storage unit. Yet when located in the data ports 200a, the write allocator maintains a pool of free blocks across the multiple storage units. As described herein, the write allocator 465 utilizes its free block pool when allocating new blocks in accordance with the flexible block numbering policy.

In response to a write data access request to a lun issued by a client 110, the write allocator 465 in the switch port 200 generates new mappings for portions of the lun that are overwritten with new data and allocates new blocks for those overwritten portions of the lun from its free block pool. The new mappings are synchronously updated at all of the other ports. This global update may illustratively be performed by port 200a, by the NVRAM module or by the storage appliance 300. The new data is then written to storage devices 142 and the new mappings are updated (cached) at the mapping tables 205 of other ports. Again as an optimization, the new data may be first written to NVRAM to facilitate rapid client response. The write allocator then communicates (e.g., periodically) the newly generated mappings to the virtualization layer 450 on the storage appliance 300, which updates on-disk structures describing the lun.

Once the write allocator 465 provides the switch ports 200 with the virtualization mappings of storage locations specified by a client block-based data access request, the storage appliance 300 "steps aside" as a high-speed connection is created through the switch 120 between a data port 200a and a storage port 200c coupled to a storage unit 140. Notably, the storage appliance does not buffer (temporarily store) the request, including any data, associated with a lun served by the storage unit. Rather the request and data are buffered at the data port 200a of the switch until transferred to the storage unit 140, which then accesses one or more locations of the storage devices 142 as determined by the virtualization mappings.

For example, assume a client 110 attempts to transfer write data associated with a block-based write request to the storage appliance 300. The write data (along with the write request packet) would typically be stored in memory 304 of the appliance until it is subsequently transferred to the disks for storage. By employing storage switch 120, however, the storage appliance 300 avoids the need to store and forward the write data. Rather the write data is stored in memory 204 of the data port 200a receiving the request (the "source" port) until a decision is rendered as to where to forward the data (the "destination" port). As noted, the write allocator 465 renders the forwarding decision and provides that decision to the data port 200a through the use of virtualization mapping. In response to the forwarding decision, the write data request is forwarded over the switch fabric 122 to the storage port 200c coupled to the appropriate storage unit 140. Thus, the need for store and forward operations in the storage appliance is eliminated. It should be noted that the storage switch 120 may need to store and forward the write data request if the forwarding decision for the request is not rendered fast enough to allow "cut-through style" performance.

Similarly, a read request issued by a client 110 is stored (buffered) in the appropriate source data port 200a of the storage switch 120 until the write allocator 465 decides to which destination storage port 200c that request should be forwarded. The appropriate virtualization mapping generated by the write allocator then instructs the source data port to transfer that request to the proper destination storage port. In response, the storage port 200c forwards the request to the proper storage unit 140, which may utilize its internal virtualization mapping to direct the request to the proper disk(s) 142. Thereafter, the storage unit 140 returns a response (including any requested data) to the source data port 200a (via the storage port 200c) and onto the client 110.

As noted, the read and write requests handled by the switch 120 as described above are SAN (block-based) data access requests. NAS (file-based) data access requests are sent directly to the storage appliance 300, primarily because the mapping function for files and directories is more complex than for block-based SAN requests. That is, file access requests require look-up operations into various data structures, checking of user identifiers and so forth. File access requests are therefore received at the multi-protocol engine 402, which embodies a set of adapters that is different from the set of adapters needed for block-based requests. Yet even for file-based data access, the storage appliance utilizes the backend storage units 140 coupled to the switch 120 and, thus, acts as a "client" of the storage units. Data links 136 are used to transfer file data between the storage appliance 300 and switch 120.

It should be noted that at any time, a storage port 200c of the switch 120 may own a sequence of logical block numbers (i.e., a range of blocks) for a lun. A block range can, over time, move from one storage port to another storage port (e.g., when there is no free storage in the connected storage unit or when load balancing across storage units). In addition, different ranges of blocks can be owned by different storage ports 200c. Illustratively, ownership of a block range is determined by the storage appliance 300; when ownership of a range changes, all data ports 200a are notified. Moreover, all write requests to the range of blocks owned by a storage port 200c are forwarded to that port; this requires some level of coordination between the data and storage ports. For example, (i) when a storage port 200c owns a range of blocks, a data port 200a may not cache mappings in that range and (ii) in response to changing a mapping with its block range, a storage port may update the mapping that is cached in all data ports.

Figure 7:
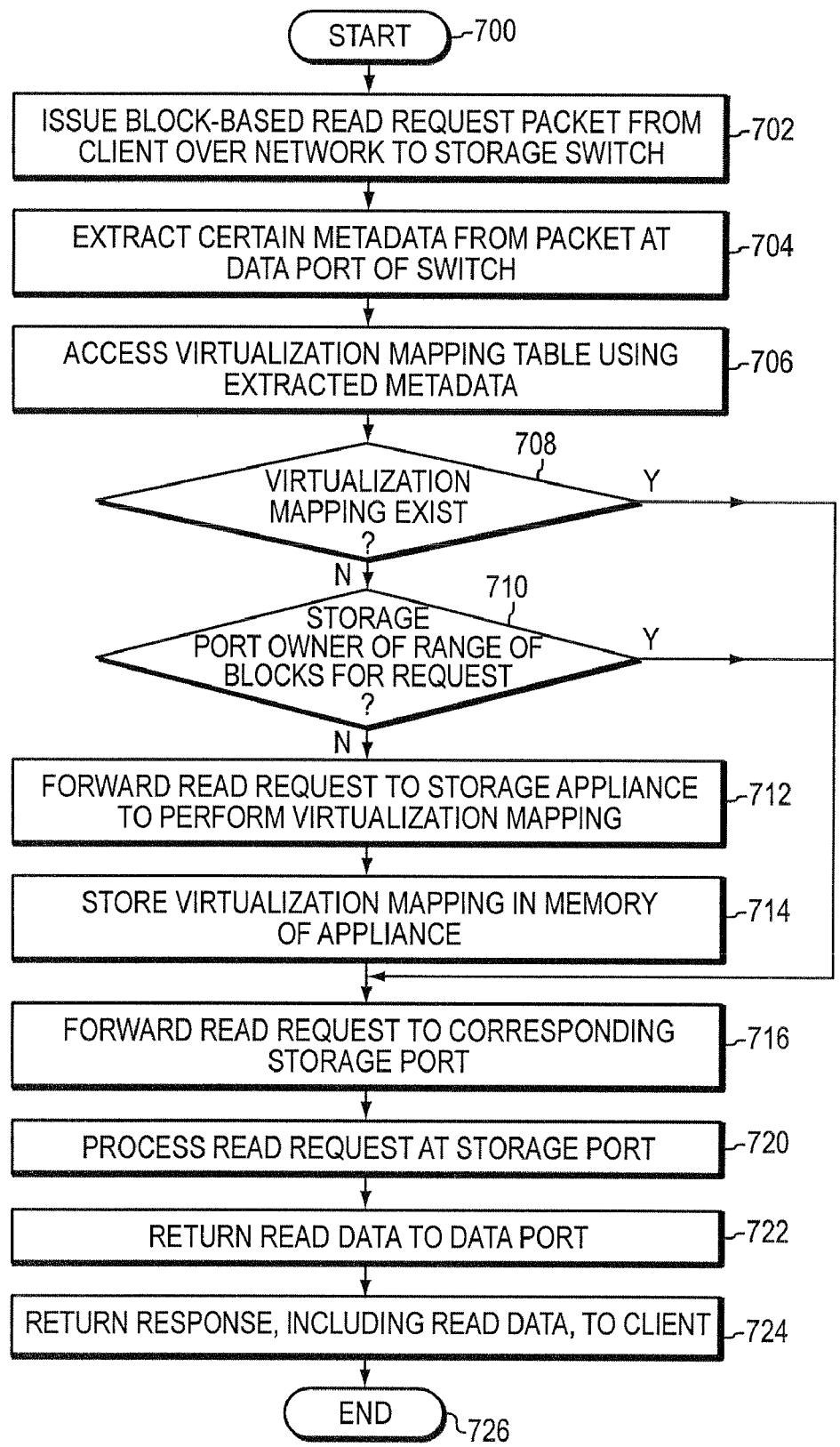
FIG. 7 is a flowchart illustrating a sequence of steps involved with servicing a block-based read request received at the storage switch of an integrated storage virtualization and switch system in accordance with the present invention.

FIG. 7 is flowchart illustrating a sequence of steps involved with servicing a block-based read request received at the storage switch 120 of the integrated storage virtualization and switch system 100 in accordance with the present invention. The sequence starts at Step 700 and proceeds to Step 702 where a client 110 issues the block-based read request (illustratively as a SCSI encapsulated packet) over the network 102 to the switch 120. At Step 704 the protocol engine 216 of the data port 200a receiving the request extracts certain metadata, e.g., a LUN identifier (ID) and block number, reflecting a logical view of the data exported to the client from the SCSI packet. As noted, the write allocator 465 configures the data port with virtualization mappings that enable steering of the read request to one or more storage ports 200c, each coupled to a storage unit 140. To that end, the virtualization mapping table 205 is accessed using the extracted metadata in Step 706.

In Step 708, a determination is made as to whether a proper virtualization mapping entry exists for the request. If so, the read request is forwarded to the corresponding storage port 200c in Step 716. If a mapping entry does not exist in the table, a determination is made in Step 710 as to whether there is a storage port that owns a range of blocks within which the request falls. If so, the request is forwarded to that storage port in Step 716. Note that in either case, the read request is forwarded directly to the storage port 200c to thereby essentially bypass the storage appliance.

However, if there is no entry in the mapping table 205 and there is no owner of an applicable block range, the read request is forwarded to the storage appliance 300 (e.g., the virtualization system 450) in Step 712, where the virtualization system 450 utilizes the logical metadata to render a forwarding decision for the read request. In particular, the virtualization system 450 accesses (indexes into) a data structure containing one or more entries that translate the logical view (LUN ID and block number) of the data requested by the client to an intermediate physical view of the data used by one or more storage units 140. The intermediate view of the data comprises virtualization mappings manifested as, e.g., LUN ID' and block number' metadata that, in the illustrative embodiment, represents the actual "physical" locations of the data on the disks 142 as determined by the layout policy of the virtualization (file) system. However, this intermediate physical view of data may alternatively be exported to the storage appliance 300 by the storage units and thereby reflect a logical view of the data from the perspective of the storage units. In Step 714, the virtualization mapping is stored in memory 304 of the appliance prior to being passed over the control link 134 to the corresponding storage port of switch 120 (Step 716). Notably, the previous (old) virtualization mapping information is included in the request(s) forwarded to the storage port.

The storage port 200c receives and processes the request in Step 720. In the illustrative embodiment, the storage port processes the request as follows. If the requested block has been overwritten, the storage port looks-up the new block number in its mapping table and retrieves the requested data from the block. If the requested block was not overwritten, the storage port retrieves the requested data using the old virtualization mapping information. In either case, the storage port 200c returns the retrieve (read) data to the data port 200a in Step 722. In Step 724, the data port 200a returns a response, including the read data, to the client 110 and the sequence then ends at Step 726.

Figure 8:
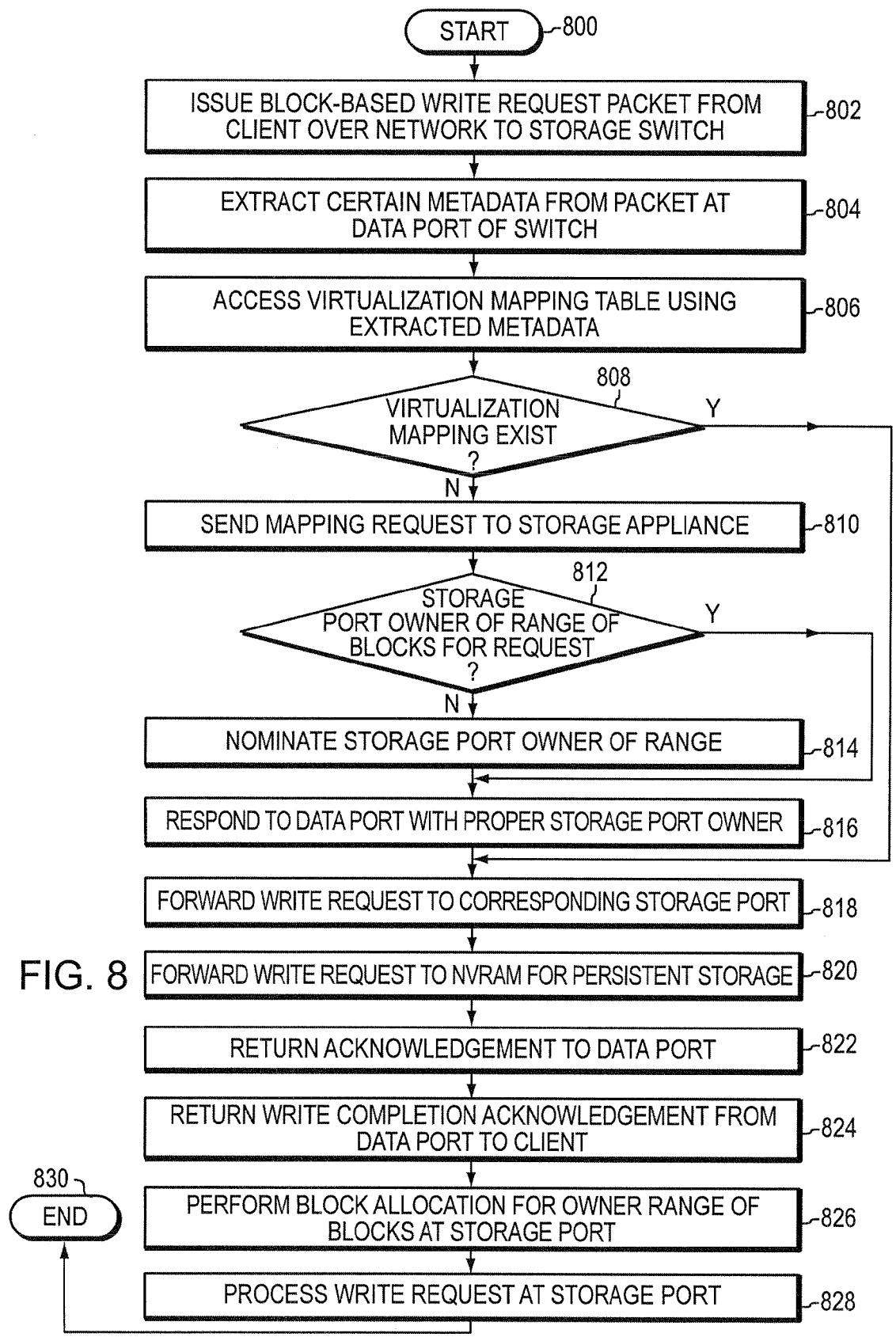
FIG. 8 is a flowchart illustrating a sequence of steps involved with servicing a block-based write request received at the storage switch of the integrated storage virtualization and switch system in accordance with the present invention.

FIG. 8 is a flowchart illustrating a sequence of steps involved with servicing a block-based write request received at the storage switch 120 of the integrated storage appliance and storage switch system 100 in accordance with the present invention. The sequence starts at Step 800 and proceeds to Step 802 where a client 110 issues the block-based write request (illustratively as a SCSI encapsulated packet) over the network 102 to the switch 120. At Step 804 the protocol engine 216 of the data port 200a receiving the request extracts certain metadata, e.g., a LUN identifier (ID) and block number, from the SCSI packet. As noted, the LUN ID and block number metadata reflect a logical view of the data exported to the client 110 by the integrated storage appliance and switch system 100. In Step 806, the virtualization mapping table 205 is accessed using the extracted metadata to determine the storage port 200c that owns a range of blocks within which the request falls.

Specifically, in Step 808, a determination is made as to whether a proper virtualization mapping entry exists that indicates the storage port that owns the block range. If so, the write request is forwarded to that storage port in Step 818. Otherwise, the data port 200a sends a mapping request to the storage appliance 300 in Step 810. In Step 812, the storage appliance (virtualization system 450) determines whether a proper storage port owner exists for the relevant block range. If so, the storage appliance responds with the proper owner entry in Step 816. However, if a storage port owner does not exist for the relevant block range, the storage appliance 300 nominates a storage port as the owner of the range in Step 814 and responds to the data port with the proper owner entry in Step 816.

In Step 818, the data port forwards the write request to the corresponding storage port 200c. The storage port also forwards the write request (and write data) to the NVRAM for persistent storage in Step 820 and then returns an acknowledgement to the data port 200a in Step 822.

In Step 824, the data port 200a returns a write completion acknowledgement to the client 110. Thereafter, during background processing, the storage port 200c performs block allocation for its owned range of blocks (Step 826). Note that more than one lun's block ranges can be owned by the storage port. The storage port also (i) updates the virtualization mappings of its owned block range, (ii) informs the storage appliance of these updated mappings and (iii) flushes (updates) the mappings in the data ports 200a The storage port 200c processes the request in Step 828 by writing (storing) the requested data to the storage unit 140. As noted, the intermediate physical view of data exported to the storage appliance 300 and contained in the virtualization mapping may reflect a logical view of the data from the perspective of the storage unit. In that case, the storage unit 140 may further translate the intermediate physical view (LUN ID' and block number') to a physical view (LUN ID" and block number") directed to actual locations of the data on the disks 142. The sequence ends at Step 830.

In the illustrative embodiment, each internal read and write request generated by the data port 200a comprises a LUN ID' value, a block number' (starting address), and a length of the request, along with write data, if any. The LUN ID' value may represent a RAID group of a volume 144 coupled to a storage unit 140. As there may be multiple RAID groups in a volume, each LUN ID' may represent a unique RAID group of the volume. In this context, the LUN ID (logical view) extracted from the data access request received at the data port 200a may represent a lun (vdisk), whereas the LUN ID' (intermediate physical view) provided by the storage appliance as a virtualization mapping may represent a RAID group striped across the disks 142 in accordance with the illustrative RAID-4 level implementation. Note that the lun data may be further striped across multiple RAID groups.

Moreover, there may be multiple levels of virtualization (LUN ID and block number) mappings occurring within the integrated storage virtualization and switch system 100 as the data transcends from the storage switch 120 to the storage devices 142. For example, there may be a translation of logical LUN IDs to intermediate physical LUN IDs at the data/storage port level of the switch and a translation of intermediate physical LUN IDs to physical LUN IDs at the storage unit level. This translation arrangement may continue for additional levels of storage provided to the system. Each storage unit 140 may export the intermediate physical view of its storage (i.e., a logical view from the perspective of the storage unit) to the storage appliance 300 via data structures, such as "raidmaps", that provide dbn to vbn mappings to the storage appliance. As noted, there is typically a one-to-one mapping between the information stored on the disks in, e.g., a dbn space, and the information organized by the virtualization (file) system in, e.g., vbn space. An example of raidmap that may be advantageously used with the present invention is described in U.S. patent application Ser. No. 10/394,890, entitled Location-Independent RAID Group Virtual Block Management, filed on Mar. 21, 2003, now issued as U.S. Pat. No. 7,111,147 on Sep. 19, 2006, which application is hereby incorporated by reference as though fully set forth herein.

Ordering of data access requests received at the storage switch is generally dictated by conventional protocol semantics (e.g., SCSI semantics) and priority arrangements. Where these semantics and arrangements specify such ordering, a plurality of locking modes may be implemented by the integrated system 100. For example, locking may be implemented in the form of a persistent reservation on a shared resource, such as lun, which requires communication between the data and/or storage port and the storage appliance 300 in order to obtain a lock on the resource. In addition, the data and/or storage port may utilize conventional techniques to institute locking of the shared resource and preclude access by a particular request until a previous request is executed.

Furthermore, conflicts among clients 110 attempting to access to a shared resource may be resolved through requests to the storage appliance 300 for virtualization mappings associated with those requests. In this case, the order in which the storage appliance returns the virtualization mappings dictates the order of access to the shared resource. Other priority arrangements (e.g., priority based on identity of the clients) may be imposed on the storage switch in accordance with various quality of service (QoS) features of the switch. An example of a QoS service offering may be bandwidth reservation in the form of reserving a certain amount of bandwidth for a port, for a port and client combination, or for a port, client and lun combination.

The integrated storage virtualization and switch system 100 facilitates scaling of the storage appliance by increasing the connectivity between clients 110 and the storage appliance 300 through the use of additional data ports 200a provided by the storage switch 120. The size and performance of storage devices (such as disks 142) served by the storage appliance 300 can also be scaled by increasing the number of connections to the backend storage units 140 through the use of additional storage ports 200c provided by the switch. Moreover, the storage switch eliminates any "memory bottleneck" when accessing the storage units and enhances storage performance of the system 100 by obviating the use of "store and forward" operations within the storage appliance 300 for block-based protocol traffic. Instead, such SAN-based traffic is transferred directly between the clients 110 and the storage units 140 through the switch 120. The integrated system also allows the use of low cost storage for, e.g., archival purposes.

While there has been shown and described an illustrative embodiment of an integrated storage virtualization and switch system 100 that services file and block protocol access requests for information to storage units 140 coupled to the switch 120, it is to be understood that various other adaptations and modifications may be made within the spirit and scope of the invention. For example, in an alternate embodiment of the invention, there may be two storage switches 120 coupled to the storage appliance 300 for redundancy purposes. In addition, there may be two storage appliances 300 coupled to each storage switch 120, wherein the storage appliances are illustratively configured in a cluster failover arrangement. Moreover, there may be still other alternate embodiments of the integrated storage virtualization and switch system 100.

Figure 9:
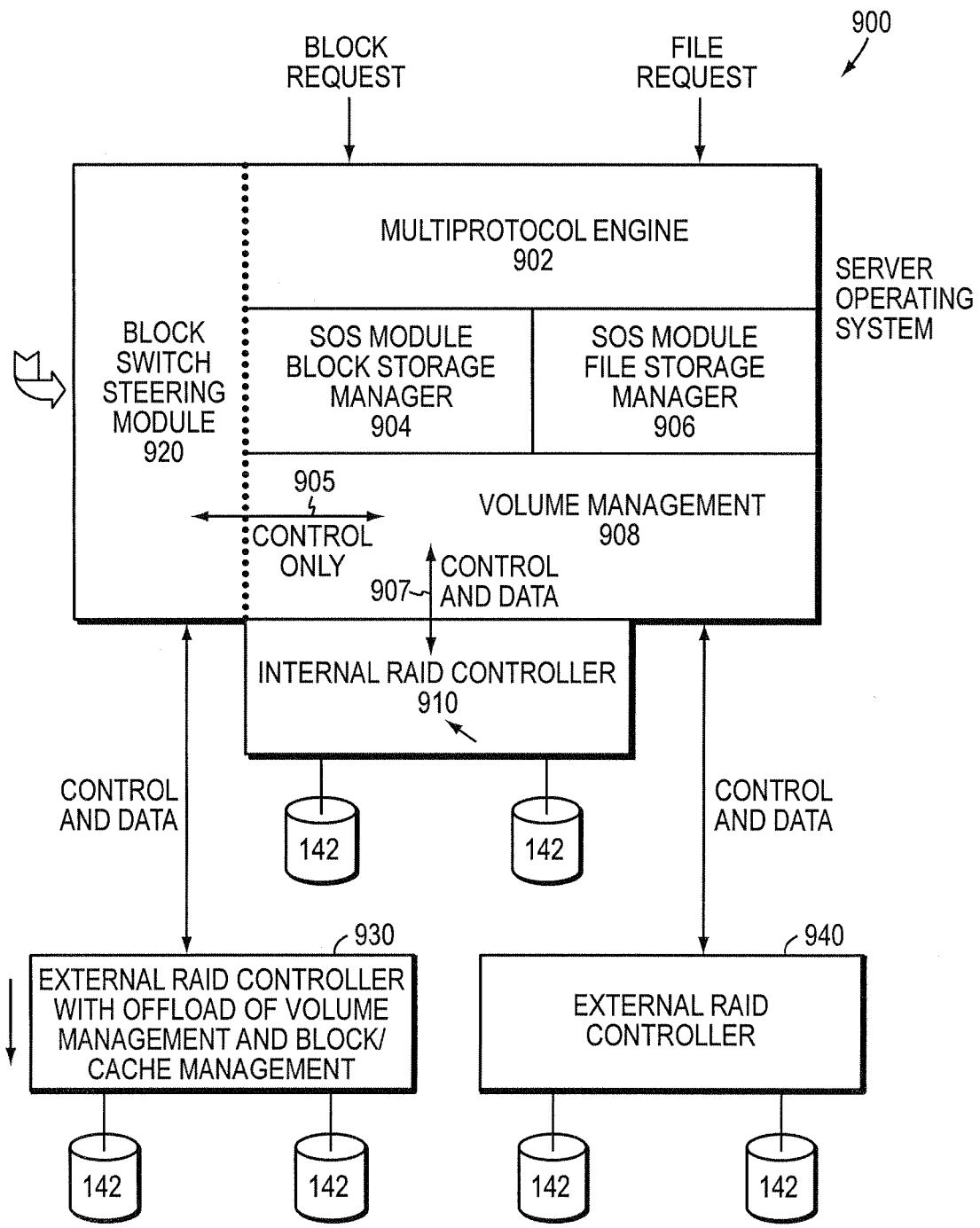
FIG. 9 is a schematic block diagram of an alternate embodiment of a system having a multi-protocol storage appliance coupled to a storage switch in an integrated manner.

For example, FIG. 9 is a schematic block diagram of an alternate embodiment of a system having a multi-protocol storage appliance coupled to a storage switch in an integrated manner. The integrated system 900 comprises a multi-protocol engine 902 that provides data paths for clients 110 to access information stored on the system 900. A first storage operating system (SOS) module is embodied as a block storage manager 904 that cooperates with a second SOS module embodied as a file storage manager 906 to logically organize the stored information as named files, directories and luns. A volume management module 908 provides virtualization mappings to a block switch steering module 920 over a control-only port (or path) 905 and to an internal RAID controller 910 over one or more control and data communication paths 907. As noted, the virtualization mappings may correlate (map) a logical view of the information requested by a client to an intermediate "physical" view of that information exported by the storage units 140. In addition, the system 900 includes a first external RAID controller 930 coupled to the block switch steering module 920, as well as a second external RAID controller 940 coupled to the volume management module 908.

Operationally, the integrated system 900 serves both file and block protocol access to information stored on storage devices 142. That is, the integrated system 900 can direct access to the internal RAID controller 910 for data stored locally in storage devices 142. In addition, the integrated system 900 can select access to external RAID controllers 940 or, via block switch steering module 920, to external RAID controller 930. The RAID controllers 910, 930, 940 can implement the same or different RAID levels, including, e.g., RAID level 4 or 5 and can be provided by different manufacturers. The integrated system 900 enables re-direction of block requests issued by one or more clients to the multi-protocol engine 902 by passing those requests through the block switch steering module 920 to the first external RAID controller 930. Here, the first external RAID controller 930 offloads volume management and block/cache management functionality from the volume management module 908. Alternatively, the integrated system 900 may service requests by, inter alia, enabling the volume management module 908 to pass the requests to the second external RAID controller 940 or the internal RAID controller 910.

A preferred embodiment of the invention has been described herein with reference to a storage appliance having a storage operating system with a virtualization system and a file system layer (among other components), which manages file semantics in order to access data organized as luns and files. It should be understood, however, that the invention can be practiced in any system or device that steers data access requests for information to storage units coupled to a storage switch. One type of system or device in which the invention can be embodied is designed to perform a data storage function, and if so, may perform data-related operations, e.g., in response to data access requests. Such requests may use file-based and/or block-based semantics, depending on the implementation and, correspondingly, the system or device may organize data in files, blocks, luns or in another manner. Moreover, such systems and devices may or may not incorporate features and functions described herein, such as, for example, a file system layer or virtualization system, or may combine or otherwise modify their operation, without departing from the principles of the invention. Finally, the invention has been described herein using nomenclature such as "virtualization mapping" which may appear to be specific to implementations of the invention providing virtualization functionality; however, the invention in its broader sense is not so limited.

The foregoing description has been directed to one or more specific embodiments of this invention. It will be apparent, however, that other variations and modifications may be made to the described embodiments, with the attainment of some or all of their advantages. For instance, it is expressly contemplated that the teachings of this invention can be implemented as software, including a computer-readable medium having program instructions executing on a computer, hardware, firmware, or a combination thereof. In addition, it is understood that the data structures described herein can include additional information while remaining within the scope of the present invention. Accordingly this description is to be taken only by way of example and not to otherwise limit the scope of the invention. Therefore, it is the object of the appended claims to cover all such variations and modifications as come within the true spirit and scope of the invention.

What is claimed is:

1. A method for operating a computer data storage system, comprising:

connecting one or more clients to a plurality of ingress ports of a storage switch;

connecting one or more data storage devices to a plurality of egress ports of the storage switch, wherein at least one egress port of the plurality of egress ports is connected to the one or more data storage devices via a storage unit;

storing virtualization mappings in a selected ingress port of the plurality of ingress ports, wherein the virtualization mappings are provided to the storage switch by a multi-protocol engine;

receiving a data request from a client at the selected ingress port of the storage switch, wherein the data request comprises metadata reflecting a logical view of requested data, and wherein the selected ingress port is configured to process a SAN request;

in the event that the logical view of the requested data has a mapping in the selected ingress port of the plurality of ingress ports of the storage switch, forwarding the data request to a selected egress port of the plurality of egress ports of the storage switch to be processed at the selected egress port with the mapping; and in the event that the logical view of the requested data does not have the mapping in the selected ingress port of the storage switch, forwarding a mapping request multi-protocol engine, the multi-protocol engine generating the mapping of the logical view of the requested data, and forwarding the data request from the multi-protocol engine to the selected egress port of the storage switch to be processed at the selected egress port.

2. The method as in claim 1, further comprising:
receiving a NAS based request as the data request.

3. The method as in claim 1, further comprising:
receiving a SAN based request as the data request.

4. The method as in claim 1, further comprising:
providing NAS services through a memory map, and providing SAN services, comprising LUN emulation, through the memory map.

5. The method as in claim 1, further comprising:
implementing the virtualization mappings as the mapping to provide a unified view of storage served by the one or more data storage devices.

6. The method as in claim 1, further comprising:
correlating the logical view of the information requested by the client to an intermediate physical view of the information exported by the one or more data storage devices by the virtualization mappings.

7. The method as in claim 1, further comprising:
providing a LUN identifier (ID) and block number metadata by the logical view of the information.

8. The method as in claim 6, further comprising:
providing an intermediate LUN ID and block number metadata by the intermediate physical view of the information.

9. The method as in claim 1, further comprising:
providing data paths through the storage switch for the one or more clients to access information served by the one or more storage devices.

10. The method as in claim 1, further comprising:
organizing a storage operating system of the multi-protocol engine as a file manager and a LUN manager that cooperate to logically organize information stored on the one or more data storage devices as named files and LUNs.

11. The method as in claim 1, further comprising:
organizing a storage operating system of the multi-protocol engine as a volume manager that provides the virtualization mappings to the storage switch.

12. The method as in claim 1, further comprising:
providing a switching function by a switch fabric of the storage switch to transfer information traffic among ports of the storage switch.

13. The method as in claim 1, further comprising:
organizing the storage switch with a crossbar comprising point-to-point connections between all ports on the storage switch, the point-to-point connections facilitating transfer of information traffic between two ports independent of a transfer of traffic among other ports of the storage switch.

14. The method as in claim 1, further comprising:
coupling one or more control ports of the storage switch to the multi-protocol engine.

15. The method as in claim 1, further comprising:
serving one or more storage volumes by each of the one or more data storage Devices, wherein each storage device is an intelligent device.

16. A computer data storage system, comprising:

a storage switch comprising a plurality of ingress ports configured to be connected to one or more clients;

one or more data storage devices connected to a plurality of egress ports of the storage switch, wherein at least one egress port of the plurality of egress ports is connected to the one or more data storage devices via a storage unit;

one or more ingress ports of the plurality of ingress ports configured to store virtualization mappings, wherein the virtualization mappings are provided to the storage switch by a storage system;

a selected ingress port of the storage switch configured to receive a data request from a client, wherein the data request comprises metadata reflecting a logical view of requested data, and wherein selected ingress port is further configured to process a SAN request;

in the event that the logical view of the requested data has a mapping in a selected ingress port of the plurality of ingress ports of the storage switch, a selected egress port of the switch with the mapping configured to receive the data request and further configured to process the data request; and in the event that the logical view of the requested data does not have the mapping in the selected ingress port of the storage switch, the storage switch further configured to send a mapping request to the storage system, the storage system configured to generate the mapping of the logical view of the requested data, and further configured to forward the data request from the storage system to the selected egress port of the storage switch to be processed at the selected egress port.

17. The data storage system as in claim 16, further comprising:
the data request is a NAS based request.

18. The data storage system as in claim 16, further comprising:
the data request is a SAN based request.

19. The data storage system as in 16, further comprising:
the storage system further configured to provides NAS services through a memory map, and further configured to provides SAN services, including LUN emulation, through the memory map.

20. The data storage system as in claim 16, further comprising:
a storage operating system of the storage system configured to implement the virtualization mappings to provide a unified view of storage served by the one or more data storage devices.

21. The data storage system as in claim 16, further comprising:
the virtualization mappings configured to correlate the logical view of the information requested by the client to an intermediate physical view of the information exported by the one or more data storage devices.

22. The data storage system as in claim 16, wherein the logical view of the information comprises a LUN identifier (ID) and block number metadata.

23. The data storage system as in claim 21, wherein the intermediate physical view of the information comprises an intermediate LUN ID and block number metadata.

24. The data storage system as in claim 16, wherein the storage system is further configured to provide data paths through the storage switch for the one or more clients to access information served by the storage unit.

25. The data storage system as in claim 16, further comprising:
a storage operating system of the storage system organized as a file manager and a LUN manager configured to logically organize information stored on the one or more data storage devices as named files and LUNs.

26. The data storage system as in claim 16, further comprising:
a storage operating system of the storage system organized as a volume manager configured to provide the virtualization mappings to the storage switch.

27. The data storage system as in claim 16, further comprising:
a switch fabric configured to provide a switching function to transfer information traffic among ports of the storage switch.

28. The data storage system as in claim 16, further comprising:
a switch fabric organized as a crossbar comprising point-to-point connections between all ports on the storage switch, the point-to-point connections configured to facilitate a transfer of information traffic between two ports independent of a transfer of traffic among other ports of the storage switch.

29. The data storage system as in claim 16, wherein the storage switch further comprises one or more control ports coupled to the storage system.

30. The data storage system as in claim 16, further comprising:
one or more storage volumes configured to be served by at least one of the one or more data storage devices, wherein at least one of the one or more data storage devices is an intelligent device.

31. A computer readable storage media containing executable program instructions executed by a processor, comprising:
program instructions that connect one or more clients to a plurality of ingress ports of a storage switch;
program instructions that connect one or more data storage devices to a plurality of egress ports of the storage switch, wherein at least one egress port of the plurality of egress ports is connected to the one or more data storage devices via a storage unit;
program instructions that store virtualization mappings in a selected ingress port of the plurality of ingress ports, wherein the virtualization mappings are provided to the storage switch by a multi-protocol engine;
program instructions that receive a data request from a client at the selected ingress port of the storage switch, wherein the data request comprises metadata reflecting a logical view of requested data, and wherein the selected ingress port is configured to process a SAN request;
in the event that the logical view of the requested data has a mapping in the selected ingress port of the plurality of ingress ports of the storage switch, program instructions that forward the data request to a selected egress port of the plurality of egress ports of the storage switch to be processed at the selected egress port with the mapping; and
in the event that the logical view of the requested data does not have the mapping in the selected ingress port of the storage switch, program instructions that forward a mapping request to the multi-protocol engine, program instructions that generate the mapping of the logical view of the requested data, and program instructions that forward the data request from the multi-protocol engine to the selected egress port of the storage switch to be processed at the selected egress port.

32. A method for operating a computer data storage system, comprising:
connecting one or more clients to a storage switch via a selected ingress port of a plurality of ingress ports of the storage switch;
connecting one or more data storage devices to a plurality of egress ports of the storage switch;
storing virtualization mappings in the selected ingress port, wherein the virtualization mappings are provided to the storage switch by a storage system;
receiving an input/output (I/O) request from a client of the one or more clients at the selected ingress port, the request comprising metadata reflecting a logical view of a requested data of the I/O request;
in the event that the logical view of the requested data has a mapping in the selected ingress port of the storage switch, forwarding the data request to a selected egress port of the storage switch to be processed at the selected egress port with the mapping; and
in the event that the logical view of the requested data does not have the mapping in the selected ingress port of the storage switch, forwarding a mapping request to the computer data storage system, the computer data storage system generating the mapping of the logical view of the requested data and forwarding the data request from the computer data storage system to the selected egress port of the storage switch to be processed at the selected egress port with the mapping.

33. A method for operating a computer data storage system, comprising:
a plurality of ingress ports of a storage switch configured to connect one or more clients to the storage switch;
a plurality of egress ports of the storage switch configured to connect one or more data storage devices to the storage switch;
one or more ingress ports of the plurality of ingress ports configured to store virtualization mappings, wherein the virtualization mappings are provided to the storage switch by the computer data storage system;
a selected ingress port of the plurality of ingress ports configured to receive an input/output (I/O) request from a client of the one or more clients, the request comprising metadata reflecting a logical view of a requested data of the I/O request;

in the event that the logical view of the requested data has a mapping in a selected ingress port of the plurality of ingress ports of the storage switch, the storage switch configured to route the I/O request to a selected egress port of the plurality of egress ports that has the mapping, the selected egress port configured to process the I/O request;

in the event that the logical view of the requested data does not have the mapping in the selected ingress port, a control port configured to send a mapping request to the computer data storage system, the computer data storage system configured to generate the mapping of the logical view of the requested data and further configured to forward the I/O request from the computer data storage system to the selected egress port of the storage switch to be processed at the selected egress port; and a data structure of the switch configured to store the mapping of the logical view of the requested data generated by the computer data storage system at the selected egress port.

34. A computer readable storage media containing executable program instructions executed by a processor, comprising:

program instructions that connect one or more clients to a storage switch via a selected ingress port of a plurality of ingress ports of the storage switch;

program instructions that connect one or more data storage devices to a plurality of egress ports of the storage switch;

program instructions that store virtualization mappings at the selected ingress port, wherein the virtualization mappings are provided to the storage switch by a multi-protocol engine;

program instructions that receive an input/output (I/O) request from a client of the one or more clients at the selected ingress port, the request comprising metadata reflecting a logical view of a requested data of the I/O request;

in the event that the logical view of the requested data has a mapping in the selected port of the plurality of ingress ports of the storage switch, program instructions that forward the data request to a selected egress port of the plurality of egress ports of the storage switch to be processed at the selected egress port with the mapping; and in the event that the logical view of the requested data does not have the mapping in the selected ingress port of the storage switch, program instructions that forward a mapping request to the multi-protocol engine, program instructions that generate the mapping of the logical view of the requested data, and program instructions that forward the data request from the multi-protocol engine to the selected egress port of the storage switch to be processed at the selected egress port with the mapping.

* * * * *

UNITED STATES PATENT AND TRADEMARK OFFICE
CERTIFICATE OF CORRECTION

PATENT NO. : 7,747,836 B2
APPLICATION NO. : 11/119085
DATED : June 29, 2010
INVENTOR(S) : Vijayan Rajan et al.

Page 1 of 1

It is certified that error appears in the above-identified patent and that said Letters Patent is hereby corrected as shown below:

In the Specification:

In col. 13, line 10 should read:
~~ports~~parts. This global update may illustratively be performed by In the Claims:

In col. 19, line 27 should read:
storage switch, forwarding a mapping request to the multi- In col. 20, line 22 should read:
more data storage ~~Devices~~devices, wherein each storage device In col. 20, line 39 should read:
requested data, and wherein the selected ingress port is further In col. 20, line 64 should read:
the storage system further configured to provide~~s~~ NAS In col. 20, line 66 should read:
to provide~~s~~ SAN services, including LUN emulation Signed and Sealed this
Twenty-fourth Day of December, 2013

Margaret A. Focarino
*Commissioner for Patents of the United States Patent and Trademark Office*